United States Patent Office 3,792,077
Patented Feb. 12, 1974

3,792,077
2,2-DIMETHYLPROPANEDIOL-1,3-DINITRITE
Rudolf Bermes, Ludwigshafen, and Karl Schmeidl, Frankenthal, Germany, assignors to Badische Anilin- & Soda-Fabrik Aktiengesellschaft, Ludwigshafen am Rhine, Germany
No Drawing. Filed Oct. 4, 1971, Ser. No. 186,513
Claims priority, application Germany, Sept. 4, 1971, P 21 44 420.2
Int. Cl. C07c 77/02
U.S. Cl. 260—467          1 Claim

ABSTRACT OF THE DISCLOSURE

Nitrites of glycols and glycol derivatives obtainable by esterification with nitrous acid. The compounds are eminently suitable as diazotizing agents, particularly in organic solution.

---

The invention relates to compounds having the Formula Ia or Ib $$ONO-(\overset{R}{\underset{|}{C}}H-CH_2-O)_nX \quad \text{or} \quad ONO-R^1-ONO$$
(Ia) (Ib)

in which

R denotes hydrogen or methyl,
$R^1$ denotes a linear or branched alkylene radical having four to nine carbon atoms,
X denotes alkyl, phenyl, acetyl or NO, and
$n$ denotes 2 or 3 with the proviso that $n$ is also 1 when X denotes alkyl, phenyl or acetyl.

Examples of alkylene radicals $R^1$ are:

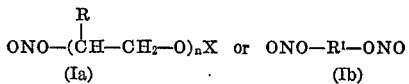

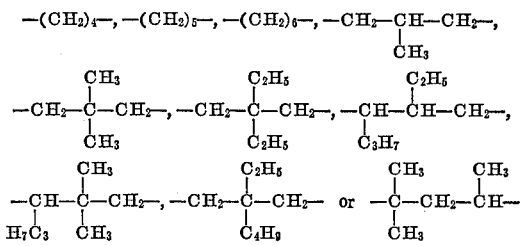

Examples of alkyl radicals X are methyl, ethyl, propyl or butyl.

Examples of compounds having the Formula Ia are the nitrites of the following compounds:

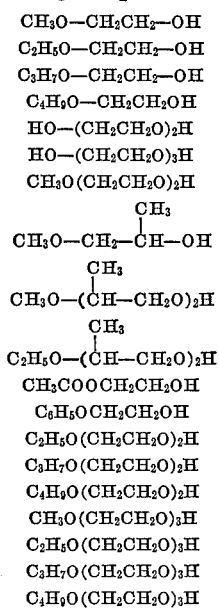

In order to prepare compounds having the Formula Ia or Ib, the corresponding hydroxy compounds (commercial purity being adequate) may be esterified with nitrous acid or oxides of nitrogen by known methods. Details of the production are described in the examples.

Compounds having the Formula II:

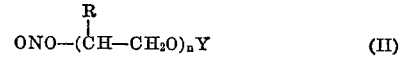

in which

Y denotes alkyl having one to four carbon atoms, acetyl or NO, and
R and $n$ have the meanings given above, are of particular industrial importance.

Individual preferred compounds are the nitrites of the following diols and diol hemiethers:

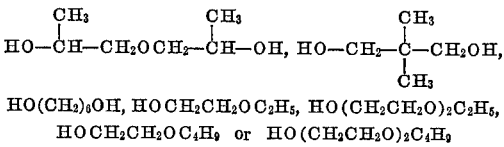

$HO(CH_2)_6OH$, $HOCH_2CH_2OC_2H_5$, $HO(CH_2CH_2O)_2C_2H_5$,
$HOCH_2CH_2OC_4H_9$ or $HO(CH_2CH_2O)_2C_4H_9$

The new compounds are eminently suitable for the diazotization of amines instead of nitrous acid, particularly when using a non-aqueous medium or an aqueous medium containing a non-aqueous solvent. Handling the new compounds is surprisingly much less dangerous than handling known nitrites of low molecular weight alcohols. In this connection reference may be made to the physiological properties and explosiveness of nitrites of low molecular weight alcohols.

The following examples illustrate the invention; amounts or percentages therein are by weight; temperatures are in degrees centigrade.

EXAMPLE 1

591 parts of glycol monobutyl ether is stirred with 500 parts of ice and 345 parts of sodium nitrite. Then while continuing the stirring 632 parts of about 30% hydrochloric acid is allowed to flow in beneath the surface at a moderate rate. The temperature is prevented from rising above 10° C. by external cooling. The nitrite separates out and is drawn off from the aqueous phase in a separating funnel. 714 parts of butyl glycol nitrite (97% of the theory) is obtained. It is washed successively with water and dilute sodium carbonate solution and dried over sodium sulfate. Refractive index $n_D^{22}=1.4025$.

EXAMPLE 2

671 parts of dipropylene glycol is stirred with 1000 parts of ice and 690 parts of sodium nitrite. While stirring well, 1265 parts of about 30% hydrochloric acid is run in fairly quickly beneath the surface of the mixture. The temperature is kept below 5° C. by external cooling. Stirring is continued for a few minutes, the lighter product phase is separated in a separating funnel and 908 parts (94% of theory) of dipropylene dinitrite is obtained and is washed with ice-water and sodium bicarbonate solution and dried over sodium sulfate. Refractive index $n_D^{22}=1.4110$.

EXAMPLE 3

521 parts of 2,2-dimethylpropanediol-1,3 is dissolved in 500 parts of water and stirred with 500 parts of ice and 690 parts of sodium nitrite. 1265 parts of about 30% hydrochloric acid is then stirred in below the surface with external cooling so that the temperature does not rise above 5° C. Stirring is continued for another ten minutes and the organic phase is separated from the aqueous phase in a separating funnel. 800 parts (98% of the theory) of the dinitrite of 2,2-dimethylpropanediol-1,3 is obtained.

The product is washed with water and dried successively over anhydrous sodium carbonate and sodium sulfate. Refractive index $n_D^{22}=1.4070$.

When the hydroxy compounds set out in the following table are used and a procedure analogous to that in Examples 1 to 3 is followed, corresponding nitrites are obtained:

| Example number | Hydroxy compound | Refractive index of the (di)nitrite | Measured at °C. |
|---|---|---|---|
| 4 | HOCH$_2$CH$_2$OCH$_3$ | 1.3790 | 23 |
| 5 | HOCH$_2$CH$_2$OC$_2$H$_5$ | 1.3884 | 22 |
| 6 | HOCH$_2$CH$_2$OC$_3$H$_7$ | 1.3925 | 26 |
| 7 | HOCH$_2$CH$_2$OC$_6$H$_5$ | 1.5062 | 22 |
| 8 | HOCH$_2$CH$_2$OCOCH$_3$ | 1.4040 | 23 |
| 9 | HO(CH$_2$CH$_2$O)$_2$H | 1.4068 | 26 |
| 10 | HO(CH$_2$CH$_2$O)$_2$CH$_3$ | 1.4075 | 21 |
| 11 | HO(CH$_2$CH$_2$O)$_2$C$_2$H$_5$ | 1.4112 | 22 |
| 12 | HO(CH$_2$CH$_2$O)$_2$C$_3$H$_7$ | 1.4111 | 26 |
| 13 | HO(CH$_2$CH$_2$O)$_2$C$_4$H$_9$ | 1.4182 | 22 |
| 14 | HO(CH$_2$CH$_2$O)$_3$H | 1.4242 | 22 |
| 15 | HO(CH$_2$CH$_2$O)$_3$CH$_3$ | 1.4188 | 26 |
| 16 | HO(CH$_2$CH$_2$O)$_3$C$_2$H$_5$ | 1.4202 | 26 |
| 17 | HO(CH$_2$CH$_2$O)$_3$C$_3$H$_7$ | 1.4222 | 26 |
| 18 | HO(CH$_2$CH$_2$O)$_3$C$_4$H$_9$ | 1.4265 | 22 |
| 19 | HO(CH$_2$)$_4$OH | 1.4055 | 25 |
| 20 | HO(CH$_2$)$_5$OH | 1.4115 | 21 |
| 21 | HO(CH$_2$)$_6$OH | 1.4155 | 23 |
| 22 | HOCH$_2$C(C$_2$H$_5$)$_2$CH$_2$OH | 1.4348 | 20 |
| 23 | HOCH$_2$—C(CH$_3$)$_2$—CHOH—C$_3$H$_7$ | 1.4240 | 25 |
| 24 | HOCH$_2$CH(C$_2$H$_5$)CHOH—C$_3$H$_7$ | 1.4258 | 21 |

We claim:
1. The compound of the formula

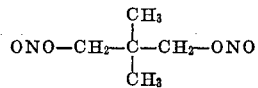

References Cited

Kuhn et al., J. Am. Chem. Soc., vol. 78, pp. 2719–2722 (1956).

LELAND A. SEBASTIAN, Primary Examiner

U.S. Cl. X.R.

260—466